Aug. 17, 1943.　　K. W. SCHULZ ET AL　　2,326,889
APPARATUS FOR MAKING INSULATING MATERIAL
Filed July 15, 1942　　2 Sheets-Sheet 1
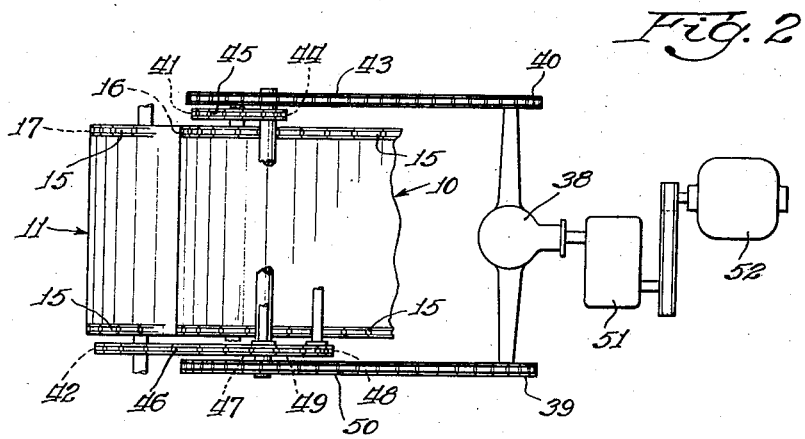
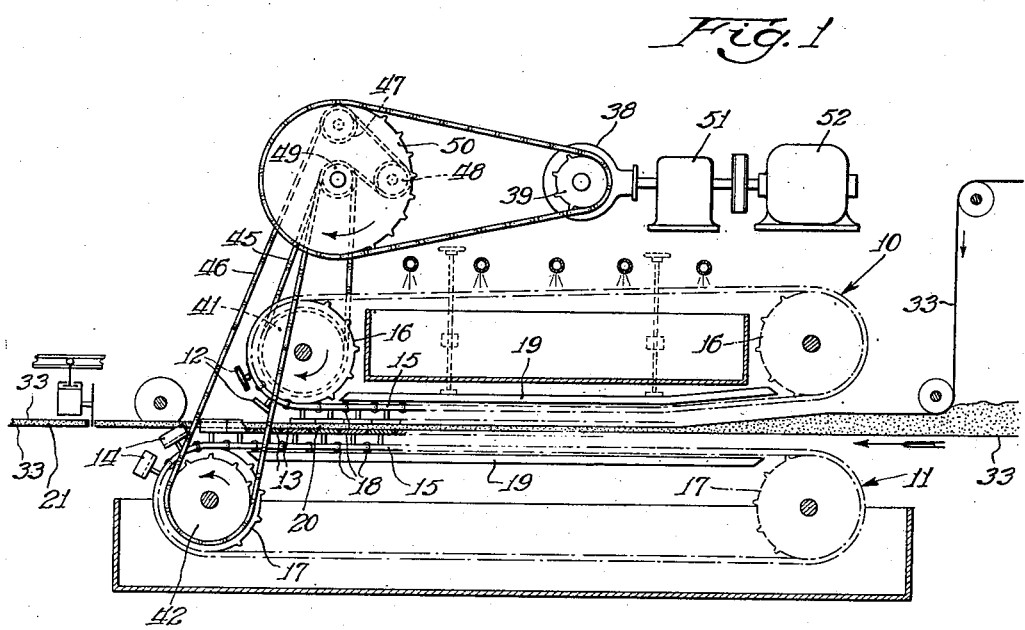
Inventors:
Kurt W. Schulz and
Carl G. Schulz
By: Roland C. Lehn
Atty.

Aug. 17, 1943. K. W. SCHULZ ET AL 2,326,889
APPARATUS FOR MAKING INSULATING MATERIAL
Filed July 15, 1942 2 Sheets-Sheet 2

Inventors:
Kurt W. Schulz and
Carl G. Schulz
By: Roland C Rehm
Atty.

Patented Aug. 17, 1943

2,326,889

UNITED STATES PATENT OFFICE 2,326,889

APPARATUS FOR MAKING INSULATING MATERIAL

Kurt W. Schulz and Carl G. Schulz, Joliet, Ill.

Application July 15, 1942, Serial No. 450,998

3 Claims. (Cl. 25—42)

This invention relates to the manufacture of insulating materials, and among other objects aims to provide improved apparatus for making such materials.

The invention may readily be understood by reference to one apparatus embodying the invention and illustrated in the accompanying drawings.

In said drawings:

Fig. 1 is an elevation of a portion of the primary conveyors and the driving mechanism therefor;

Fig. 2 is a plan view thereof.

Figure 4:
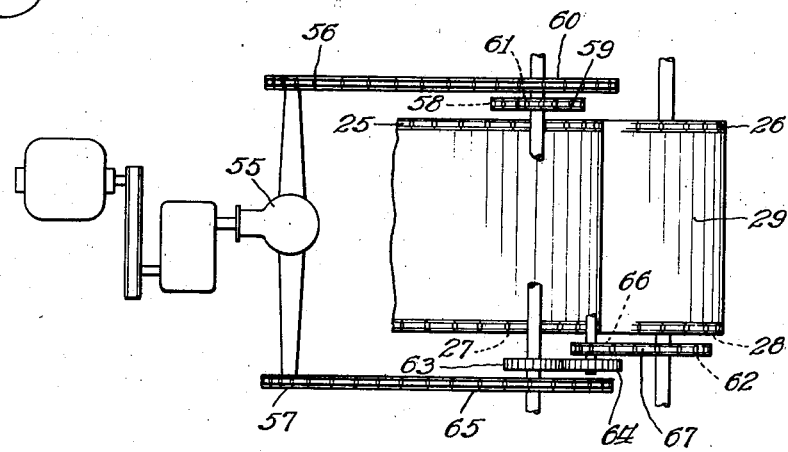
Fig. 4 is a plan view thereof.

The illustrated insulating material comprises board, slabs or other molded forms of an insulating material bonded with a thermo-plastic or other binder, and preferably faced with fibrous sheets such as heavy paper. One such material and an apparatus for making the same is illustrated in co-pending Denning application, Serial No. 365,375, patented July 7, 1942, No. 2,289,250. The material disclosed in said Denning application comprises exfoliated vermiculite compressed into bonding contact and bonded together in such compressed bonding contact with a small amount of high melting point asphalt and preferably faced with heavy paper or other fibrous sheets.

Details of the aforesaid product and its manufacture are fully disclosed in said Denning application and a brief description thereof will suffice here: Granules of exfoliated vermiculite are mixed with a relatively small amount of molten asphalt which is hard or sets at ordinary temperatures. The granules are relatively much cooler than the molten asphalt and congeal a thin film of asphalt thereon which serves first to prevent penetration of asphalt into the granules and finally as the means for bonding the granules together. The granules are then compressed into thorough bonding contact and thus held until the asphalt has set sufficiently to maintain the bond between the granules. The amount of asphalt is too small otherwise to bond the granules adequately and a greater amount would very substantially reduce the insulating efficiency of the material and prohibitively increase its weight. To hold the mass of granules in compressed condition and to set the asphalt, they are passed (in a layer between upper and lower facing sheets) between upper and lower conveyors as shown in said Denning application and represented herein by conveyors 10 and 11.

In the present apparatus these conveyors comprise a plurality of flat sections 12 and 13. The latter are sections of the lower conveyor and have end flanges 14 which form the sides of the mold when the sections lie in close juxtaposition along the upper run of the lower conveyor. The sections are carried on pairs of endless conveyor chains 15 which travel over driving and take-up sprockets 16 and 17. The upper conveyor 10 is generally similar to the lower except that, as stated above, its sections 12 are plain (not having flanges) and are of such length as to pass between the end flanges 14 of the lower conveyor, thereby completing the mold in which the material is molded and compressed.

The conveyor chains 15 include at the pivots between adjacent links rolls 18 which travel over pairs of rails 19 the lower pair of which supports the upper run of the lower conveyor against the pressure imposed on the material. The conveyor chain rolls of the lower run of the upper conveyor travel under the pair of rails 19 by means of which gradual compression of the material is effected. The latter rails are slightly upwardly curved at the entrance end of the conveyor to effect gradual compression but the balance of the rails run parallel to the lower rails 19. (See Fig. 1.) The upper rails are advantageously made adjustable toward and away from the lower rail to regulate degree of compression and final thickness. Further details of the conveyor construction are not pertinent here; they are disclosed and described in said Denning application.

The conveyor sections are appropriately cooled so as to abstract heat from the insulating material while the latter is under compression to set the asphalt.

Upon issuing from the primary conveyors 10 and 11 the continuous layer 20 of the material is trimmed and cut into sections 21 which are transferred preferably on flat palettes 22 to prevent bending of the material, and superposed in two or more layers 23 and 24 on a secondary conveyor which completes the cooling of the material under compression.

The secondary conveyor may advantageously be much lighter in weight than the primary conveyor. In the present case, it comprises pairs of upper and lower conveyor chains 25 and 26 traveling around driving sprockets 27 and 28. The conveyor chains carry transverse conveyor elements 29 by means of which the material is compressed. The conveyor elements are welded or otherwise secured to the links of the conveyor chains. The chains carry at the pivots between the links, rollers 30 which travel between upper and lower pairs of rails 31 and 32 by means of which the material is maintained under compression during the cooling process. The rails are advantageously adjustable toward and away from each other to adjust the degree of compression.

Figure 3:
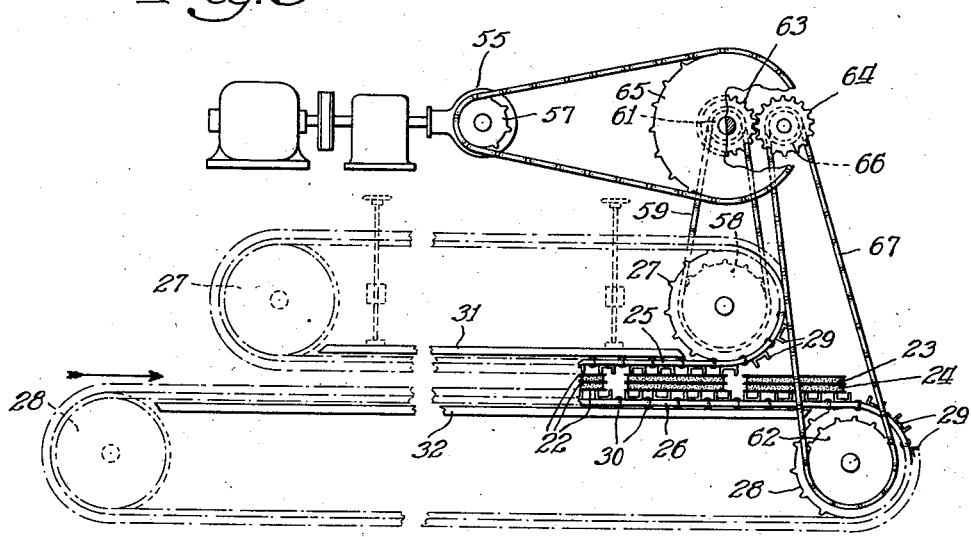
Fig. 3 is an elevation of a portion of the secondary conveyors and the driving mechanism therefor.

The secondary conveyor may advantageously be located parallel to the primary conveyor (instead of continuing in a straight line therefrom) and travel in a reverse direction as shown in Fig. 3. It may be substantially longer than the primary conveyor without requiring increase in building length.

Heretofore the material issued from the primary conveyors 10 and 11 from time to time in damaged condition, such as marred or wrinkled facing sheets 33, despite the fact that both upper and lower primary conveyors were connected with positive driving mechanisms intended to drive them at exactly identical surface speeds. For this reason the condition of the surface sheets was not attributed to the driving mechanism particularly since, as far as one could observe, the conveyors travelled at the same speed.

After careful tests it was discovered that the conveyors were not subject to the same conditions. For example, the end flanges 14 carried only on the lower conveyor sections were a disturbing factor. As these left their straight line travel in passing around the terminal conveyor sprockets, their speed in the direction of travel of the material was reduced and created a drag against the side of the material which, of course, continues forward movement at a constant, and higher, speed. This and doubtless other conditions which could not be detected caused differences in the resistance offered by the respective conveyors. These differences were much greatr than could be attributed to the circumstance that the weight of both conveyors was imposed on the support for the lower conveyor since this weight (and the increased friction caused thereby) was insignificant compared to the compression load imposed on both upper and lower conveyors.

Apparently the difference in drag or resistance offered by the respective conveyors caused non-uniform conditions in the driving chains and other conveyor driving mechanism. For example, a difference in pull or resistance caused a greater strain in one driving chain than in the other. This would cause one chain to ride higher on the sprocket teeth than the other chain (due perhaps to temporary stretching of the conveyor chain) with the result that one conveyor would be momentarily driven faster than the other. Any radial slipping or shifting of the chain on the sprocket teeth in or out would cause a change in relative speed. Even though such changes in relative speed were of such short duration as to be described as jerking in the conveyor chains, the result was reflected in wrinkling of the surface sheets and other marring of the material compressed between the conveyors.

Any inequality or irregularity in relative conveyor speeds resulted in transmission of stress, mainly shearing stress, through the material from one conveyor to the other, resulting in damage to the material. We have discovered that such damage could be eliminated by making it impossible for one conveyor to carry, even momentarily, a greater load (i. e., offer greater drag or resistance) than the other.

Equalization of load is effected in this instance, by interposing a differential mechanism 38 in the driving system. Contrary to what one would expect, the conveyors travel at the same speed despite the fact that the differential actually makes different relative speeds possible. In practice, however, tendency for one conveyor to assume a greater load automatically produces a tendency for the other conveyor to speed up and equalize the load. The result is that neither conveyor travels faster than the other.

The differential mechanism may advantageously be that in a rear axle construction of a motor vehicle, preferably a truck because of the relatively high load. On the respective axle shafts extending from the differential mechanism are driving sprockets 39 and 40 which drive respectively sprockets 41 and 42 secured to the driving sprocket shafts of the upper and lower conveyors.

In the present instance secondary speed reduction is effected by employing intermediate, large, and small sprockets 43 and 44, the latter driving the conveyor sprocket 41 of the upper conveyor through chain 45. (Fig. 2.)

The drive for the lower conveyor requires a reversal in direction so that the lower conveyor driving sprocket 42 may be rotated in a direction opposite that of the upper conveyor driving sprocket 41. This is effected in this case by running the driving chain 46 of the lower conveyor driving sprocket 42 around idler sprockets 47 and 48 to carry it in reverse direction around the intermediate driving sprocket 49 which is of the same size as the sprocket 44 of the upper conveyor. (See Fig. 1.) A similar intermediate large sprocket 50 corresponding to the sprocket 43 is also employed in the driving system.

Primary speed reduction is effected by interposing a speed reducer 51 between driving motor 52 and differential 38. The speed reducer is connected with the drive shaft of the differential mechanism.

The secondary conveyor also presented difficulties of a somewhat different nature. Examination showed a cumulative change in relative speed which eventually became serious enough to break or damage the lower conveyor chains, which of course, were relatively much lighter than those of the primary conveyor. Careful tests showed that the lower conveyor, because of the slightly greater load thereon, would stretch slightly more than that of the upper conveyor under the driving tension. This increased the length of the individual conveyor chain links (probably by slight bending of the pivot pins between the links) thereby causing them to ride higher on the teeth of the driving sprocket with the result that the chain would be driven faster. Such increase in relative speed would, of course, impose still further load on the conveyor chain until it would actually attempt to drive the upper chain. Each increment of additional load caused additional stretch and consequent further increase in relative speed until a breakage or serious damage to the chain would interrupt operation.

Attempt of the lower conveyor to drive the upper conveyor resulted in transmission of driving stress through the intervening material itself with consequent rupture of the bond between the granules and wrinkling of the surface sheets.

The foregoing difficulties were eliminated by the use of means, in the form of a differential, for equalizing driving loads and making it impossible for one conveyor to assume a greater load than the other.

In the present case, the differential 55 (driven by motor through a speed reducer) carries driving sprockets 56 and 57 on the ends of the differential axle shafts. A rear axle and differential mechanism of an ordinary motor vehicle is advantageously employed for this purpose.

Driving sprocket 58 for the upper conveyor is driven by chain 59 through intermediate speed reducing sprockets 60 and 61 chain 59 traveling over the latter. The drive for the lower conveyor 26 includes means for reversing the direction of rotation of the conveyor driving sprocket 62. Such means are here shown in the form of a pair of meshed gears 63 and 64 the former driven by a sprocket 65 of the same size as the sprocket 60 and the latter driving sprocket 66 of the same size as the sprocket 61. Sprocket 66 drives the conveyor sprocket 62 through chain 67.

Obviously the invention is not limited to the details of the illustrative apparatus since these may be variously modified. Moreover, it is not indispensable that all features of the invention be used conjointly since various features may be used to advantage in different combinations and subcombinations.

Having described our invention, we claim:

1. Apparatus for making insulating material comprising in combination upper and lower conveyors having flights travelling substantially parallel to each other, means for causing said flights to compress insulating material carried between the same, positive driving means for said conveyors, and a differential mechanism between the driving mechanism and each conveyor to equalize the load on each conveyor.

2. Apparatus of the character described comprising in combination a pair of upper and lower conveyors having their adjacent flights spaced apart and running generally parallel to each other, means for causing said flights to apply pressure to material carried between the same, a single driving means for driving each of said conveyors at the same speed, said means including a pair of driving elements for driving respectively the upper and lower conveyors and differential mechanism driven by said driving means and located between said driving elements for equalizing the load on said conveyors to prevent transmission of force from one flight to the other through said material.

3. Apparatus of the character described comprising in combination a pair of upper and lower conveyors having their adjacent flights spaced apart and running generally parallel to each other, means for causing said flights to apply pressure to material carried between the same, a single driving means for driving each of said conveyors at the same speed, said means including a pair of driving sprockets for driving respectively the upper and lower conveyors, driven sprockets on said respective conveyors and driven by said respective driving sprockets, means interposed between one of said driving and driven sprockets for reversing the direction but not the rate of rotation of the latter, and a differential mechanism driven by said driving means and driving said respective driving sprockets for equalizing the load on said conveyors to prevent transmission of force from one flight to the other through said material.

KURT W. SCHULZ.
CARL G. SCHULZ.